Figure 1:
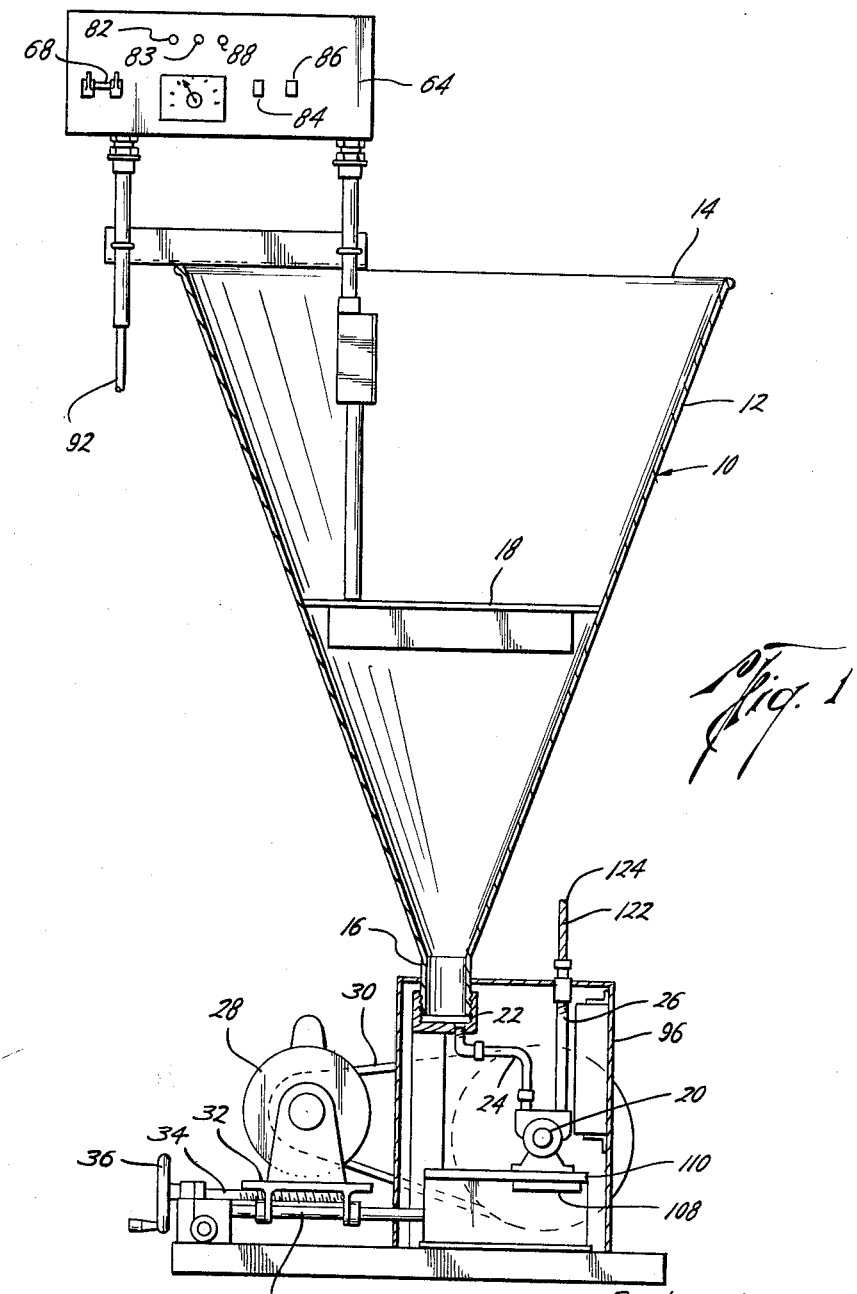

April 13, 1965 R. J. BELL ETAL 3,178,067
APPARATUS FOR THE CONVERSION OF A SOLID MATERIAL
TO A LIQUID STATE AND METERING THEREOF
Filed March 19, 1963 3 Sheets-Sheet 1

Richard J. Bell
Robert L. Campbell, Jr.
INVENTORS

BY
ATTORNEYS

April 13, 1965 R. J. BELL ETAL 3,178,067
APPARATUS FOR THE CONVERSION OF A SOLID MATERIAL
TO A LIQUID STATE AND METERING THEREOF
Filed March 19, 1963 3 Sheets-Sheet 2

Richard J. Bell
Robert L. Campbell, Jr.
INVENTORS

BY
ATTORNEYS

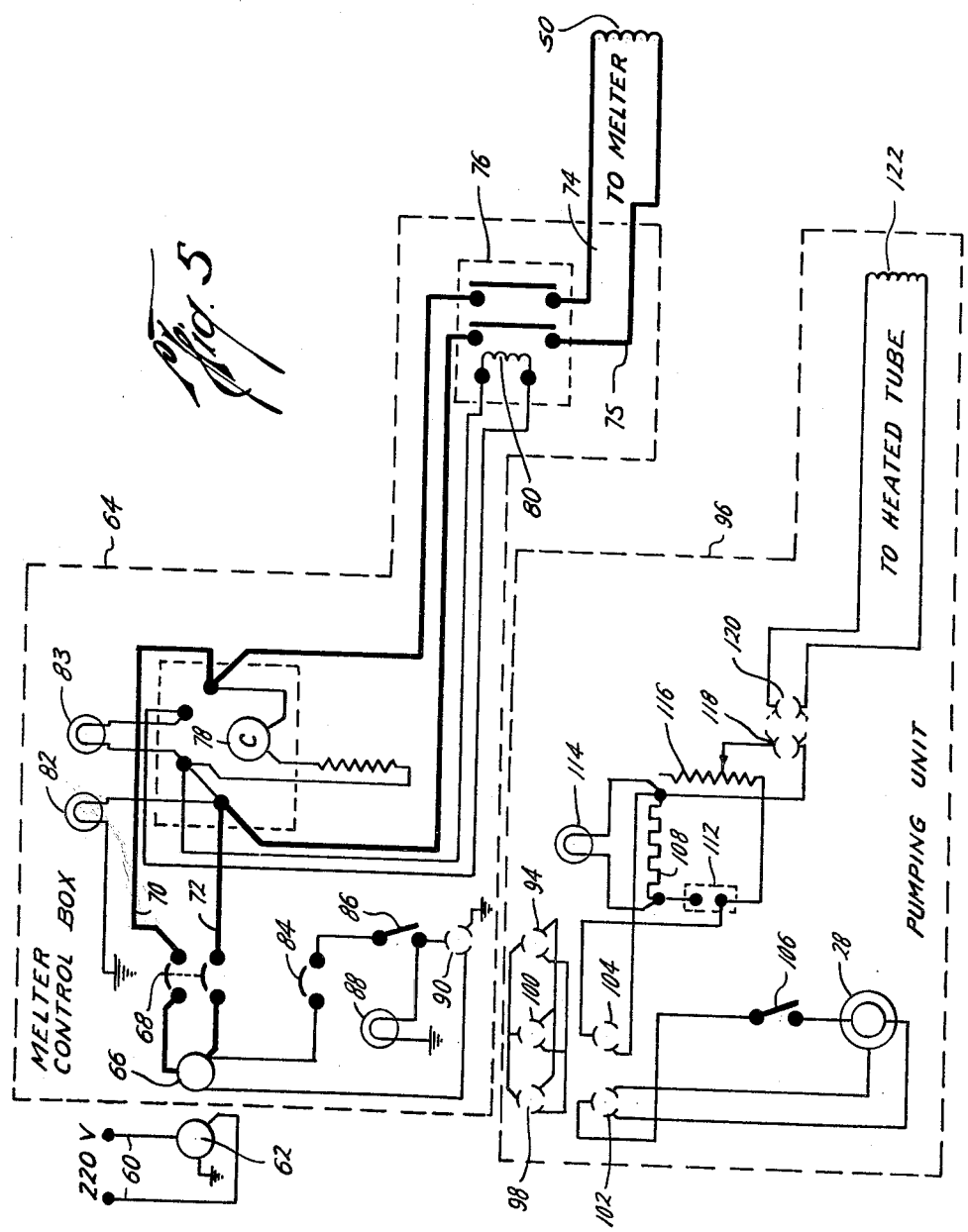

United States Patent Office 3,178,067
Patented Apr. 13, 1965

3,178,067
APPARATUS FOR THE CONVERSION OF A SOLID MATERIAL TO A LIQUID STATE AND METERING THEREOF
Richard J. Bell and Robert L. Campbell, Jr., Sherman, Tex., assignors to Anderson, Clayton & Co., Houston, Tex., a corporation of Delaware
Filed Mar. 19, 1963, Ser. No. 266,404
2 Claims. (Cl. 222—146)

The present invention relates to an apparatus for the conversion of a solid material to a liquid state and metering thereof, and more particularly, relates to controlling the melting rate of a solid material into a liquid state and metering the resulting liquid for use in a continuous flow process.

While the present invention is particularly suitable for the process of manufacturing peanut butter and will be described in connection with that use, it is to be noted that this is by way of example only and can be used in converting other solid materials to liquids and metering them for use in a continuous process.

Present day manufacturing methods for peanut butter require that a small amount (2–5%) of hydrogenated fat, preferably hydrogenated peanut oil, be incorporated into the product. The hydrogenated fat is commonly known by the industry as peanut butter stabilizer. The purpose of adding a so-called stabilizer to peanut butter is to prevent separation of the solid and liquid constituents of peanut butter, commonly referred to as "oiling off," to improve the eating quality, and to improve the texture and spreading properties. The amount of stabilizer required is dependent upon the oil content of the peanuts and the processing conditions. Also, the amount of stabilizer is quite critical. Too little stabilizer will not prevent oiling off and too much stabilizer will cause the peanut butter to crack and pull away from the sides of the container. This latter defect is referred to as "shrinking" and gives the peanut butter a very undesirable appearance in a glass container. In addition to shrinkage, an excess of stabilizer will cause peanut butter to have a dry, crumbling texture which is detrimental to spreading and eating qualities.

The common physical forms of peanut butter stabilizers are (1) a pumpable oleaginous suspension, (2) beaded, or (3) flaked. The pumpable oleaginous suspension form is metered into the ground peanuts by means of a variable speed pump. Due to its high viscosity, a large, oversized, positive displacement pump is required to meter the pumpable oleaginous suspension. On the other hand, the beaded products are measured by means of a vibratory, dry chemical feeder. This latter type of metering is considered to be less accurate than liquid metering. The third common physical form of the stabilizer, flake form, does not lend itself to dry chemical feeders, even as well as the beaded form, because of the nonuniformity of the particle size.

The present invention provides an apparatus for melting the flaked form of stabilizer and metering the melted stabilizer for use in manufacturing peanut butter. In addition, in order to avoid the necessity for heating up an entire batch of material, the present invention operates on a "melt as you go" procedure; that is, it melts only a sufficient amount of flaked stabilizer needed in the process at a given time.

It is therefore a general object of the present invention to provide an apparatus which will control the melting rate of a material while it changes the material from a solid to a liquid state, and then provides a metered amount of the liquid for use in a continuous process.

It is a still further object of the present invention to provide an apparatus which will convert only the amount of solid material to a liquid state which is needed in the process and does not unnecessarily heat or burn up the material.

Yet a further object of the present invention is the provision of an apparatus for converting a solid material to a liquid state, metering the liquid, and transmitting the liquid to a process while preventing the material from resolidifying.

A still further object of the present invention is the provision of a conical container positioned with the converging end downwardly and having an inlet at the top for entrance of solid material and an outlet at the bottom for the passage of melted material, an electrical heating plate in the container positioned between the inlet and the outlet, the heating plate having a plurality of slots and heating the material in contact with the plate to change it from the solid state to a liquid state and pass the liquid to the container outlet, and a pump connected to the outlet and delivering the fluid to a delivery conduit, and means heating the outlet, pump, and delivery conduit thereby preventing the melted material from solidifying.

A still further object of the present invention is the provision of a heating plate having a plurality of radially extending slots in the top of the plate and having a plurality of openings in the plate, the slots sloping outwardly and being in communication with one of the openings whereby the solid material contacting the plate will be melted and flow by gravity from the slots and out through the plate openings.

Yet a still further object of the present invention is the provision of an electrical heating circuit not only controlling the melting rate of the solid material but keeping the material in a melted state as it is delivered to the process which utilizes the material.

A still further object of the present invention is the provision of an apparatus for adding peanut butter stabilizer to the process of making peanut butter with the convenience of handling a dry stabilizer and with the accuracy achieved by metering a liquid product.

Figure 2:
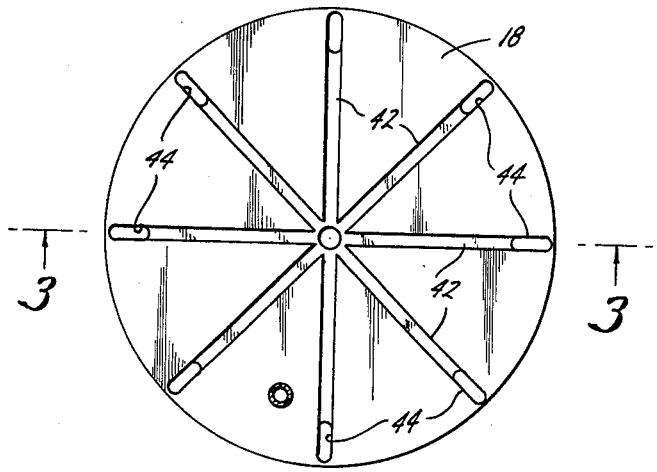
Figure 3:
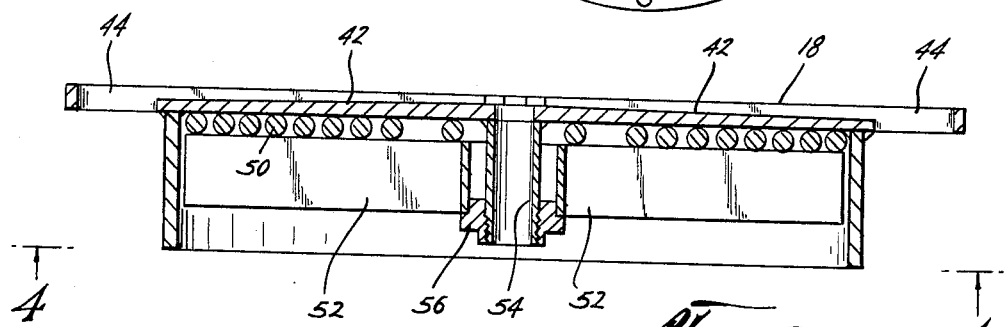
Figure 4:
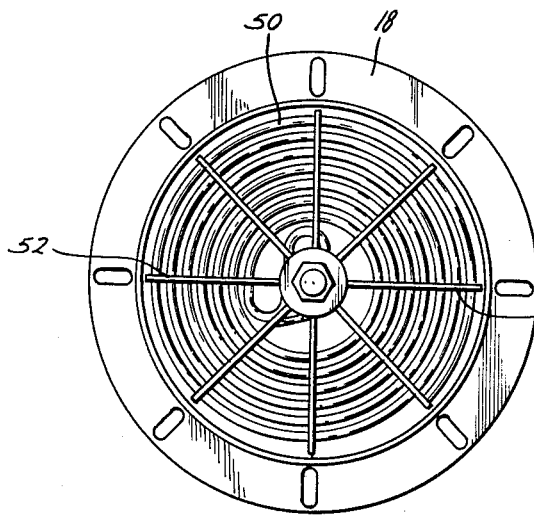

Other and further objects, features and advantages will be apparent from the following description of a presently preferred embodiment of the invention, given for the purpose of disclosure, and taken in conjunction with the accompanying drawings, where like character references designate like parts throughout the several views, and where:

FIGURE 1 is an elevational view, partly in cross section, illustrating the apparatus of the present invention, FIGURE 2 is a top view of the electrical heating plate of the present invention, FIGURE 3 is an enlarged cross sectional view taken along the line 3—3 of FIGURE 2, FIGURE 4 is a reduced view taken along the line 4—4 of FIGURE 3, and FIGURE 5 is an electrical schematic of the electrical system of the present invention.

Referring now to the drawings, and particularly to FIGURE 1, the numeral 10 generally designates the apparatus of the present invention and includes a container 12, preferably conical, having an inlet 14 for the addition of a solid material such as peanut butter stabilizer in a flaked form and an outlet 16 at the bottom for the passage of the material after it has been heated and converted to a liquid state.

An electrical plate 18 is provided in the container 12 and is designed to support the unmelted or flaked stabilizer as well as liquify it at a predetermined controlled rate and allow the melted stabilizer to flow by gravity to the outlet 16. A pump 20 is provided which acts as a metering control to receive the melted material from the container 12 and discharge it to the desired location. The container outlet 16 is provided with a cap 22 which is connected to a conduit 24 which provides for the passage of the melted material from the outlet 16 to the inlet of the pump 20. A conduit 26 is provided to the outlet of the pump 20 and is connected to a delivery tube 124 for delivering the melted material to the desired location. A motor 28, preferably electric, is connected by a variable pitch belt 30 and suitable pulley arrangement between the motor 28 and the pump 20 to provide the power source for the pump 20.

It is to be noted that the motor 28 is mounted on a base 32 which is slidably mounted on shafts 40 for movement away from and towards the pump 20 thereby changing the pitch of the flexible belt 30. The base 32 is connected to worm gear 34 which in turn is connected to a hand wheel 36. The movement of the motor 28 is accomplished by rotating the hand wheel 36 which in turn operates the worm gears 34. Thus as the hand wheel 36 and motor 28 are moved, the pitch of the belt 30 and pulley arrangement will change thereby changing the speed of the pump 20 which in turn changes the metering rate of the pump.

Referring now to FIGURES 2, 3 and 4, the details of the heating and melting plate 18 are best seen. The melting plate preferably includes a plurality of grooves 42 preferably radially extending and a plurality of openings 44. Referring to FIGURE 3, it is noted that preferably the grooves 42 are tapered to slope toward the outside edge of the plate 18 at a very slight taper and that each of the grooves 42 is in communication with one of the openings 44 which extend through the plate 18. Thus, the plate 18 while supporting the flake stabilizer while it is in a dry or solid state, when heated, allows the melted stabilizer to flow down the grooves 42 and through the openings 44 by gravity. By way of example only, the plate may have an outside diameter of 1'3", the grooves are ⅜" wide and the openings 44 may be 1½" x ⅜".

Referring now to FIGURES 3 and 4, a heating element 50 is provided which may be a tubular heating element and by way of example only may be a 240 volt, 3600 watt element. It is to be noted that the primary function of the heating plate is to convert the solid fat into a liquid fat at a predetermined rate of conversion. Only the material adjacent to the plate is heated, and it is heated only sufficiently to change the material from the solid state to the liquid state. That is, the heat energy is utilized to heat the solidified material to its melting point, or temperature, and to heat sufficiently to cause conversion to the liquid state almost instantaneously. Any heating of the liquified material is wasted heat energy as far as the present invention is concerned.

To securely hold or clamp the heating element to the bottom side of the plate 18, a plurality of radially extending clamping elements 52 are provided which are joined to a central shaft 54 which in turn is connected to the plate 18 such as by welding. The clamping elements 52 are secured to the tubular central shaft 54 by any suitable means such as a clamping nut 56.

Referring now to FIGURE 5, the electrical schematic diagram is best seen. An electrical 220 volt source 60 is provided at an outlet plug 62. Inside of a melter control box 64 (FIGURES 1 and 5), a corresponding plug 66 is provided to be connected to the plug 62 to provide the electrical source inside of the melter control box 64. A circuit breaker 68 is provided through which flows the 220 power source through the heavy lines 70 and 72 and which in turn are connected to the melter rate controller 78 and to a conventional load contactor 76. The melting rate controller 78 is connected so as to control the power applied to the heating element 50 of the heating plate of melter 18 through the load contactor 76. Thus, in response to the melting rate desired and set on the heating rate controller 78, power is applied to the magnetic coil 80 of the load contactor 76 closing the contacts and thus, depending on the setting of the controller 78, supplying power to lines 74 and 75 and to the heater coil 50 of the heater plate 18 to control the rate of melting of the solid flaked material placed on top of the plate 18. Pilot light 82 is provided to note when 110 volt power is applied through the circuit breaker 68 and pilot light 83 is provided to note when 220 volt power is applied through the circuit breaker 68.

A 110 volt power system 82 is provided having a circuit breaker 84, a power switch 86, a power indicating light 88 and an outlet plug 90. A line 92 (FIGURE 1) connects the outlet 90 with a plug 94 in the pumping unit enclosure 96 (FIGURES 1 and 5). The plug 94 in turn provides a source of energy and is connected to duplex outlet plugs 98 and 100. Two electrical power plugs 102 and 104 are provided for engagement with outlet plugs 98 and 100 and provide power to the motor and to the auxiliary heating circuits, respectively.

The plug 102 provides an electrical source for the electrical motor 28 and includes an electrical switch 104 for actuation and de-actuation of the motor 28. In the auxiliary heating circuit a heating element 108 is provided which is positioned physically, as best seen in FIGURE 1 directly under the pump mounting 110. It is noted that the heating element 108, which may be a 250 watt heating element, is connected in series with a thermostat 112 which therefore controls the heating of the element 108. The purpose of heating element 108 is to provide heat in the pumping unit box enclosure 96 to keep the container outlet 16, the conduit 24, pump 20 and conduit 26 at a sufficient temperature to prevent the melted material from solidifying. Indicator light 114 indicates when the heating element 108 is energized.

In addition, the auxiliary heating circuit includes a variable resistor 116, for example 50 ohm, which is connected to suitable male and female plugs 118 and 120 for providing an electrical circuit to an electrical coil 122 (FIGURES 1 and 5) for heating the delivery tube 124 which is outside of the pumping unit box 96 so as to prevent solidification of the melted material as it is passed through the delivery tube 124. The electrical coil 122 may be used, for instance, where the tube 124 is less than 14 feet long a spiral 28 guage asbestos covered Nichrome wire wound tightly around the tube. The power resistor 116 is adjusted to maintain the temperature of the tube 124 at approximately 160° F.

In use, the main circuit breaker 68 (FIGURES 1 and 5), is switched on and because power through the auxiliary heating circuit is desired about 30–35 minutes prior to the melting operation, the 110 circuit breaker 84 and switch 86 are closed. Preferably, the auxiliary heating circuit which includes the heating element 108 for heating the pumping unit enclosure box 96 and the heating coil 122 for heating the delivery tube 124 can be left on overnight as they are thermostatically controlled to prevent solidification of any melted material in the pump and delivery line. About five minutes before starting the addition of the solid flaked peanut butter stabilizer through the opening 14 of the material container 12 the controller 78 is turned to the on position, and set at the desired melting rate. This in turn controls the load contactor 76 through the magnetic coil 80 and supplies 220 volt power to the lines 74 and 75 and to the coil 50 of heater plate 18. The flaked solid peanut butter stabilizer may then be added to the container 12 and placed on top of the melter or heating plate 18.

Electrical switch 106 (FIGURE 5) to the electrical motor 28 is started which starts the pump 20. It should be here noted that the rate at which the dried flaked solid material is added to the container 12 is controlled by the desired output, and thus by the speed of the metering pump 20. Rotation of the adjustable wheel 36 moves the base 32 of the electrical motor 28 and changes the speed of the metering pump 20 to provide the desired metering rate. The rotation of the wheel 36 is in direct proportion to the metering rate and to the rate of addition of the flaked material to the container 12. The heater plate 18 will support the flaked solid material and in addition will provide the heat for melting the material which is adjacent the plate into a liquid state. And as best seen in FIGURES 2-4, the melted material will flow down the radially spaced slots 42 to the openings 44 and pass through the plate 18 and down to the bottom of the conical tank 12. It has been found that a heater of the type previously described will provide a sufficient heat to change the state of the flaked material from a solid to a liquid, but does not burn or unduly heat up the stabilizer material.

After the material has flowed by gravity to the outlet 16 it is pumped by the pump 20 from the outlet through conduit 24 and through the pump outlet to conduit 26 and there to the delivery tube 24 for insertion in the manufacturing process.

Because of the heating element 108, the entire pumping unit box 96 is heated and is thermostatically controlled to maintain the now liquid material in a liquid state. In addition, the heater coil 122 on the delivery tube 124 also prevents the material from solidifying in the delivery tube.

When the peanut butter manufacturing process is shut down for any reason, the pump 20 is shut down and the controller 78 is turned to the off position thereby de-energizing the heater coil 50 on the heater plate 18. Preferably, the heater element 108 and coil 122 are left on to prevent solidification of the stabilizer in the pump 20 and delivery line 124.

It is thus seen that the present invention can best be described as a "melt as you go" procedure and achieves the convenience of handling a "dry" product with the accuracy achieved by metering a liquid product and at the same time avoids the accumulation of unused melted stabilizer at the end of a day's operation.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. Apparatus for the conversion of a flaked peanut butter stabilizer to a liquid state and the metering thereof comprising,
   a conical container positioned with the converging end downwardly, said container having an inlet at the top for the entrance of the flaked stabilizer, and an outlet at the bottom for the passage of the melted stabilizer,
   an electrical heating plate positioned in said container between the inlet and the outlet and adapted to support the flaked stabilizer,
   said heating plate having a plurality of radially extending slots in the top of the plate, said slots sloping downwardly toward the outside of the plate,
   said plate also having a plurality of openings through the plate, one opening being in fluid communication with the outer end of each of said slots whereby the melted material will flow by gravity to the container outlet,
   a metering pump in communication with the container outlet,
   means controlling the speed and thus the volume of the material metered by the pump,
   a delivery conduit connected to the pump,
   an enclosure surrounding the pump,
   means for heating the enclosure, and
   an electrical heating coil for heating the delivery conduit.

2. Apparatus for the conversion of a flaked peanut butter stabilizer to a liquid state and the metering thereof comprising,
   a conical container positioned with the converging end downwardly, said container having an inlet at the top for the entrance of the flake stabilizer, and an outlet at the bottom for the passage of the melted stabilizer,
   an electrical heating plate positioned in said container between the inlet and the outlet and adapted to support the flake stabilizer,
   an electrical heating controller connected to the heating plate for controlling the melting rate of the stabilizer placed on the plate,
   said heating plate having a plurality of radially extending slots in the top of the plate,
   said plate having a plurality of openings through the plate, each of said openings being in fluid communication with the outer end of one of said slots whereby the melted material will flow into the slots and out the openings by gravity to the container outlet,
   a metering pump in communication with the container outlet,
   means controlling the volume of material metered by the pump,
   a delivery conduit connected to the pump, and,
   heating means for heating said container outlet, pump, and the delivery conduit to prevent the material from solidifying after it is melted.

References Cited by the Examiner

UNITED STATES PATENTS

| | | | |
|---|---|---|---|
| 1,457,634 | 6/23 | Neri | 222—146 |
| 1,575,152 | 3/26 | Di Battista | 222—146 |
| 2,174,319 | 9/39 | Gastrow | 222—146 |
| 2,493,490 | 1/50 | Le Clair. | |
| 2,554,802 | 5/51 | Waas | 222—146 X |
| 2,753,183 | 7/56 | Wiig et al. | 226—41 |
| 2,773,496 | 12/56 | Czarnecki | 222—146 X |

RAPHAEL M. LUPO, *Primary Examiner.*